(12) United States Patent
Gasperowicz et al.

(10) Patent No.: US 12,013,359 B2
(45) Date of Patent: Jun. 18, 2024

(54) SYSTEM AND A METHOD FOR DETERMINING A CHANGE OF SATURATION OF ADSORBENT

(71) Applicant: Advanced Digital Broadcast S.A., Bellevue (CH)

(72) Inventors: Henryk Gasperowicz, Zielona Gora (PL); Damian Popielarski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 125 days.

(21) Appl. No.: 17/895,131

(22) Filed: Aug. 25, 2022

(65) Prior Publication Data

US 2024/0019389 A1    Jan. 18, 2024

(30) Foreign Application Priority Data

Jul. 17, 2022   (EP) .................................... 22185342

(51) Int. Cl.
*G01N 27/02*     (2006.01)
(52) U.S. Cl.
CPC .................. *G01N 27/025* (2013.01)

(58) Field of Classification Search
None
See application file for complete search history.

(56) References Cited

U.S. PATENT DOCUMENTS 5,411,709 A * 5/1995 Furuki ................ G01N 29/036
422/91

* cited by examiner

*Primary Examiner* — Jas A Sanghera
(74) *Attorney, Agent, or Firm* — Rivka Friedman

(57) ABSTRACT

A system for determining a change of saturation of an adsorbent susceptible to adsorption of species in an adsorption chamber, the system comprising: an adsorbent-holding-ferrite-material cage; a cage holder configured to hold the cage within the adsorption chamber such that the movement of the cage at least in a first axis is restricted to a smaller extent than in a second axis; an exciter comprising a coil arranged at the cage, wherein the coil is connected to a voltage generator and the exciter is configured to induce eddy currents within the cage resulting in oscillation of the cage in the first axis; a spectrum analyzer connected to the coil and configured to analyze the voltage within the coil and determine its frequency response; and a saturation detector configured to determine the change of saturation based on the change of the frequency response determined by the spectrum analyzer.

8 Claims, 3 Drawing Sheets

SYSTEM AND A METHOD FOR DETERMINING A CHANGE OF SATURATION OF ADSORBENT

TECHNICAL FIELD

The present invention relates to a system and method for determining a change of saturation of adsorbent.

BACKGROUND

High-temperature hydrocarbons reforming processes typically involve conversion the substrates to low-molecular-weight substances, in order to obtain valuable kinds of fuels or substrates for chemical synthesis. Reforming process may involve introduction fuel (e.g., diesel), water and air into a reformer i.e., fuel processor—such as, for example, an autothermal reforming (ATR) chemical reactor, to obtain e.g., syngas for production pure hydrogen useful in fuel cells for green-energy production. Prior to reforming, fuel needs to be adequately purified, including desulfurization. Desulfurization is especially important in case of sulfurized feedstock because sulfur and various chemical species of sulfur can poison reformer electrodes.

Thereby, a degree of fuel desulfurization is an important factor in the production of syngas from fuels, including diesel. In reforming plants, a desulfurizer unit is typically located at the reformer inlet—to remove sulfur species contained in the fuel source. Thus, the sulfur species can be adsorbed while passing through the desulfurizer, and subsequently the fuel is directed to the reformer. The adsorbents of sulfur species—typically in a form of porous bed made of zeolite balls—have certain adsorbate capability. Once the adsorbent is exhausted, it loses its adsorbate capability, and it needs to be immediately replaced with a fresh portion, whereby the exhausted one is typically subjected to regeneration. For the above reasons, a degree of saturation of the adsorbent in the desulfurizer needs to be determined over time.

Different attempts have been taken to develop means for monitoring capacity of adsorbent beds, especially used in desulfurization units of fuel reforming cells. Some of these attempts involve measuring changes in the concentration of species to-be-adsorbed directly in a fuel downstream—after the fuel passage through the adsorbent bed. Further, the other attempts are focused on directly observing the adsorbent bed with the naked eye (changes when the adsorbent adsorbs sulfur and the time to replace the adsorbent can be determined by observing the change of color of the adsorbent through the transparent housing), or by using various sensors connected to the desulfurization unit. The latter can be regarded as more efficient. In observing the color of adsorbent or measuring the sulfur content in fuel downstream, the replacement time can be missed so that the adsorbent is still used after the adsorption capability of the adsorbent is exhausted. Thus, there is a high possibility of supplying the fuel containing too high sulfur content to the reformer.

Further, from patent literature there are known various methods for determining the degree of saturation of the adsorbents, including those of desulfurization stations of the high-temperature hydrocarbons reforming plants.

For example, an international patent application WO02/49128 describes a fuel processing system with a sulfur-removal assembly comprising sulfur-adsorbent beds, and at least one sensor for measuring the percentage of the capacity at which each of the beds is operating. The measurement is to be made by measuring the operating time during which the bed has been used or the volume of feedstock that has been passed through the bed. The signal from the sensor is transmitted to the controller.

When the measured level is less than the stored threshold level, no response is required because the sulfur adsorbent material still has sufficient remaining sulfur-adsorbing capacity. When the measured level reaches or exceeds the threshold level, the controller actuates a user-notifying device to exchange refill the bad with the fresh portion of the adsorbent.

A U.S. patent application Ser. No. 10/175,213 describes a method for determining a degree of saturation of an adsorbent bed by repeatedly measuring electromagnetic radiation reflected form the adsorbent bed—using a sensor at fixed location, and next taking the derivative of the spectroscopic property of the electromagnetic radiation at a single wavelength or, at multiple wavelengths, as a function of time; next determining a degree of saturation the adsorbent bed at a given time prior to saturation, and finally changing the adsorbent bed depending on the determined degree of saturation of the adsorbent bed.

SUMMARY OF THE INVENTION

There is a need to provide a system and method for determining a change of saturation of an adsorbent, in particular adsorbents used in desulfurization stations of high-temperature hydrocarbons reforming plants, that will allow to effectively control the degree of saturation of the adsorbent, especially with monitoring of said degree of saturation accomplished during ongoing reforming processes—in order to effectively replace the exhausted adsorbents.

In one aspect, the invention relates to a system for determining a change of saturation of an adsorbent susceptible to adsorption of species in an adsorption chamber, the system comprising: a cage made of a ferrite material and holding the adsorbent therein; a cage holder configured to hold the cage within the adsorption chamber such that the movement of the cage at least in a first axis is restricted to a smaller extent than in a second axis; an exciter comprising a coil arranged at the cage, wherein the coil is connected to a voltage generator and the exciter is configured to induce eddy currents within the cage resulting in oscillation of the cage in the first axis; a spectrum analyzer connected to the coil and configured to analyze the voltage within the coil and determine its frequency response; and a saturation detector configured to determine the change of saturation based on the change of the frequency response determined by the spectrum analyzer.

Preferably, the cage holder comprises an elastic arm on which the cage is arranged within the chamber.

Preferably, the cage contains adsorbent in amount smaller than a main adsorbent deposit within the chamber.

Preferably, the chamber has an inlet and an outlet for a stream with species to flow via the chamber and wherein the cage arranged so that upon transport of the stream though the chamber, the adsorbent within the cage is exposed to the same stream as a main deposit of adsorbent within the chamber.

Preferably, the cage is arranged coaxially with the chamber and covers from 75 to 80% of the lumen of the chamber.

Preferably, the cage holder comprises an elastic bar with the cage mounted at the end thereof.

Preferably, the coil is wound around the cage.

In another aspect, the invention relates to a method for determining a change of saturation of absorbent using the device of any of previous claims, the method comprising: activating the exciter to induce oscillations of the cage; determining a first frequency response by the spectrum analyzer; awaiting for a measurement interval; activating the exciter to induce oscillations of the cage; determining a second frequency response by the spectrum analyzer; and determining a saturation change by the saturation detector based on the first frequency response and the second frequency response.

Further aspects and features of the present invention are described in following description of the drawings.

BRIEF DESCRIPTION OF DRAWINGS

Aspects and features of the present invention will become apparent by describing, in detail, exemplary embodiments of the present invention with reference to the attached drawings, in which.

DETAILED DESCRIPTION OF EMBODIMENTS

Figure 1:
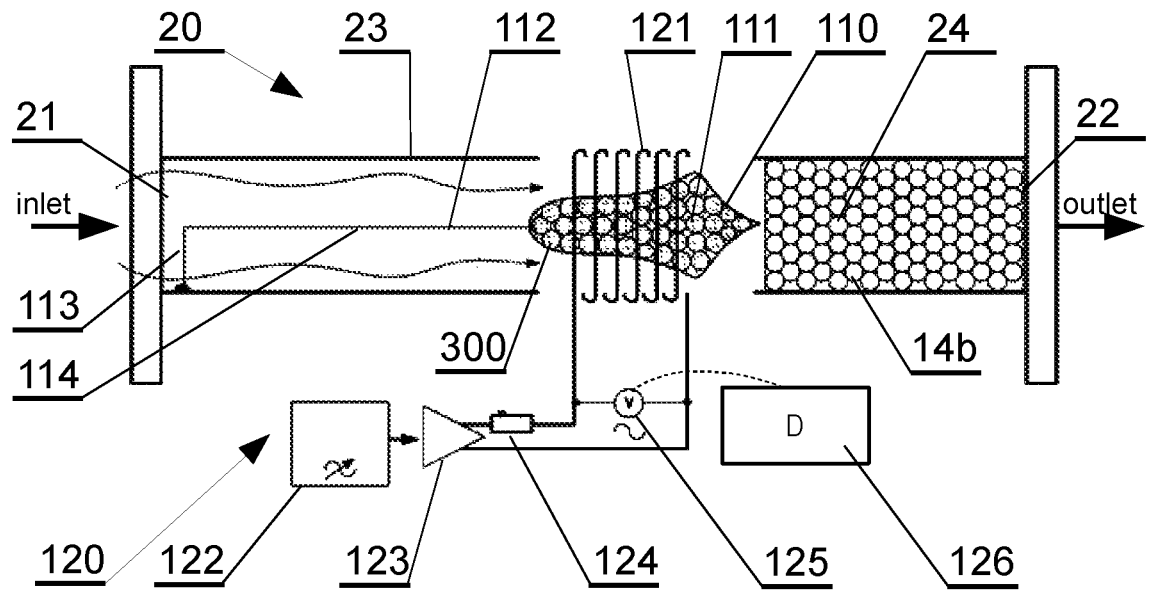
FIG. 1 shows schematically a system for determining the change of saturation of an adsorbent in one embodiment according to the present invention.

Reference will now be made to embodiments, examples of which are illustrated in the accompanying drawings. Aspects and features of the embodiments will be described with reference to the accompanying drawings. In the drawings, like reference numerals denote like elements. The present invention, however, may be embodied in various different forms and should not be construed as being limited only to the illustrated embodiments. Rather, these embodiments are provided as examples so that this disclosure will be thorough and complete, and will fully convey the aspects and features of the present invention to those skilled in the art. It shall be understood that not all of the features shown in the embodiments are essential and the scope of the protection is defined not by means of literally shown embodiments, but by the features provided in the claims.

FIG. 1 show a system for determining a change of saturation of an adsorbent. The system is supposed to be mounted within an adsorption chamber 20 having a volume 23 with an inlet 21 and an outlet 22, wherein a main deposit of adsorbent 24 is located.

For example, the system can be installed in fuel processing apparatus for reforming fuel to measure the change of saturation of an adsorbent for adsorbing species from the fuel during treatment. More particularly, the system for determining a change of saturation of an adsorbent can be installed in a desulfurizer unit of the fuel processor such as fuel reforming plant—to measure the change of saturation of the adsorbent with the sulfur species, thereby, measuring the state of an adsorbent in ongoing fuel processing process.

In addition to the main deposit of adsorbent, the system comprises a cage 110 that holds therein some amount of the same adsorbent 111 that is present in the main adsorbent deposit 24. The cage 110 is made of a ferrite material, for example from steel. Wires of the cage 110 can be arranged in various mesh patterns so as to tightly hold the adsorber inside the cage 110 and so that the absorbent 111 particles do not move with respect to the cage 110 mesh, during its movement. FIGS. 2A-2D present four embodiments of the cage 110A-110D with various mesh patterns suitable for the present invention. Alternatively, the cage 110 can comprise an insulator forming a cage body and a coil that surrounds tightly the insulator, the coil is made of a ferrite material, e.g. stainless steel comprising iron (Fe)—as shown in two further embodiments of the cage 110E, 110F—in FIGS. 2E, 2F.

The cage 110 is mounted on a cage holder 112 that is configured to hold the cage 110 within the adsorption chamber 20. As shown in this example, the cage holder 112 is an L-shaped rod, having a first arm 113 attached to the body forming the volume 23 of the chamber 20 and a second arm 114 (in form of an elastic bar) located along the axis of the chamber. The cage holder 112 is made of an elastic material, for example elastic rod, having sufficient strength to hold the cage 110 within the axis of the chamber 20, but also sufficient elasticity to allow the cage 110 to oscillate as will be explained below. Therefore, in general, the cage holder 112 is configured to hold the cage 110 such that the movement of the cage at least in a first axis (in this case, the vertical axis of the drawing) is restricted to a smaller extent than in a second axis (in this case, the horizontal axis of the drawing). Preferably, the second arm 114 has a mass at least ten times smaller than the total mass of the cage 110 with the adsorbent 111.

Figure 2A:
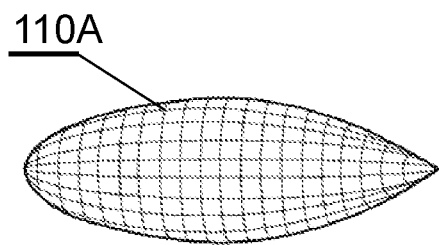
FIGS. 2A-2F show example embodiments of a cage.
Figure 2B:
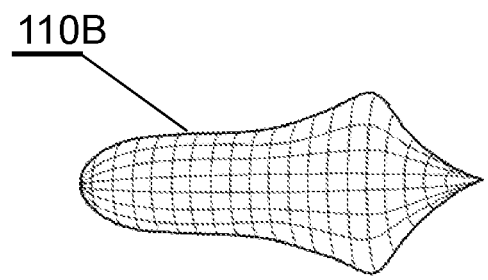
Figure 2C:
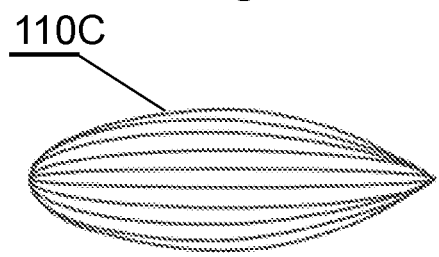
Figure 2D:
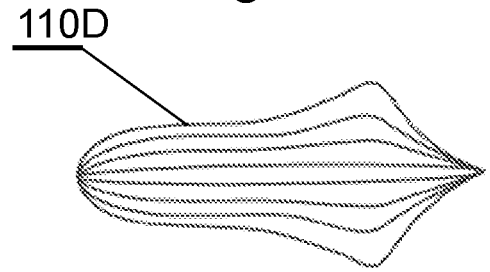
Figures 2E, 2F:
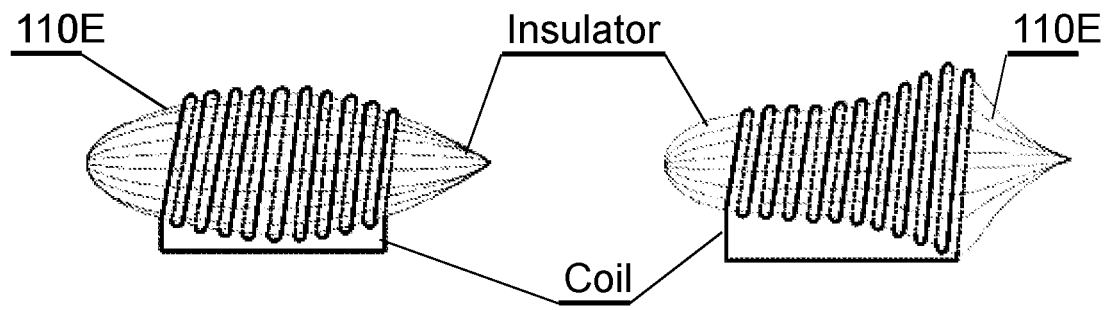

The cage 110 may have various shapes, for example such as shapes 110A, 110B shown in FIGS. 2A and 2B. Preferably, these shapes have an aerodynamic form such as to minimize the influence on the cage position by the stream flowing through the chamber 20. For example, the cage 110 may have an elongated oval-like shape having an outer diameter varying over a length of the cage 10. Alternatively, the cage 110 may have a longitudinal cross-section of symmetrical tear-like shape or symmetrical vane-like shape. The cage may cover from 75 to 80% of the lumen of the chamber 20 (which may have a form of a tube).

The system comprises an exciter 120 configured to induce oscillations of the cage 110. The exciter 120 comprises a coil 121 arranged at the cage 110 (in particular, around the cage), wherein the coil 121 is connected to a voltage generator 122. The exciter is configured to induce eddy currents within the cage 110 resulting in oscillation of the cage 110 in the first axis, wherein its movement is restricted to a small extent only (e.g., in the vertical axis of the drawing). The voltage generator 122 can be a sweeping generator that outputs voltage within a range of frequencies. The voltage generator 122 enables one to achieve a frequency that changes cyclically in a given range. Said range ($F_{min}$–$F_{max}$) encompasses $F_{resonance}$, corresponding to mechanical-electrical resonance of the cage 110 with respect to the coil 121. This is because greater frequency amplification occurs during the resonance of basic frequencies of these elements, providing a more accurate measurement of the mass change of the cage 110 adsorbent 111.

The voltage generator 122 in this embodiment is connected to the coil 121 via an amplifier 123 and a resistor 124, but other embodiments may contain various other connection arrangements. A spectrum analyzer 125 is connected to the coil 121 and configured to analyze the voltage within the coil 121 and determine its frequency response.

As the current flowing through the coil 121 induces eddy current within the cage 110, which causes interference with the current within the coil 121 and generates electromagnetic force that causes the cage 110 to move with respect to the coil 121 (which is preferably fixed still with respect to the body of the chamber 20).

The oscillations of the cage 110 depend on its weight, which includes the predetermined weight of the adsorbent and the weight of species (i.e., molecules or particles) accumulated by the adsorbent, as will be explained in more details below. Therefore, by monitoring the change in response of the cage 110 to the electromagnetic force induced by the current flowing in the coil 121, i.e., the change of the frequency response detected by the spectrum analyzer 125, the change of the saturation of the adsorbent 111 by the species can be monitored, as will be explained in more details below. Therefore, a saturation detector 126 is connected to the spectrum analyzer 125 and configured to determine the change of saturation based on the change of the frequency response determined by the spectrum analyzer 125.

The method of monitoring the change of saturation of the adsorbent bed enables to determine the mass of the adsorbent 111 contained in the cage 110 based on the magnitude of its vibrations during the current flow through the coil 121, because changes in the mass of the cage with the adsorbent are proportional to said vibrations magnitude. The mechanical oscillations (i.e., vibrations) of the cage 110 with the adsorbent 111 contained therein, can be expressed by Formula I:

$$f = \frac{1}{2\pi}\sqrt{\frac{k}{m}}$$

wherein:
- m is a total mass of the cage 110 and its contents, including the adsorbent 111 and the adsorbed species,
- k is the elasticity coefficient of the cage holder 112 to which the cage 110 is attached.

The cage 110 filled by the adsorbent 111 is induced to mechanical oscillations by coupling electromagnetically two electric circuits, firsts circuit comprising an outer inductor coil 121 at the transmitting side, and the second circuit comprising a virtual coil at the receiving side formed by closed structure of the cage 110 comprising ferritic material, and more preferably made of ferritic material. Due to the above, eddy currents induced within the ferritic material of the cage 110 (by virtue of the law of Lenz) counteract changes of the original magnetic field, which as a result generates a force which moves the cage 110 out of its position of equilibrium, thereby providing the oscillations of the cage 110. Thereby, the formed circuit is—to some extent, similar to a transformer of a compact secondary winding.

Figure 3:
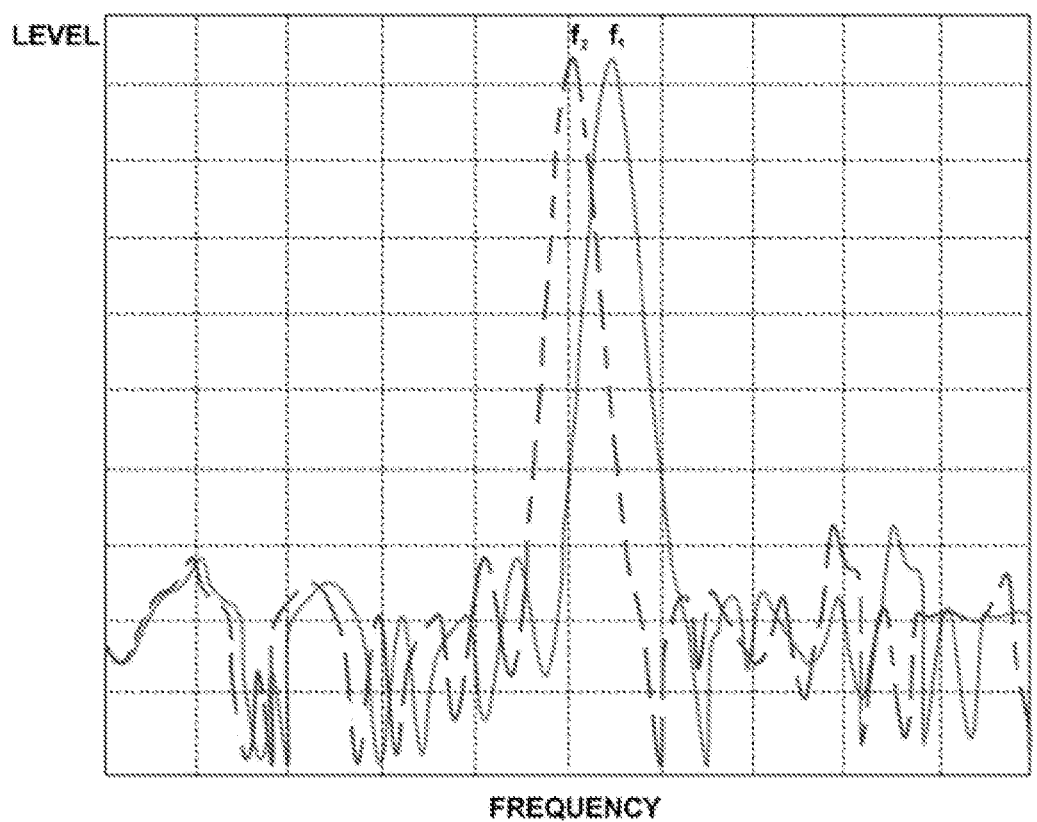
FIG. 3 shows an example frequency response observed by the spectrum analyzer.

Due to the presence of the spring means holding the cage, the cage undergoes mechanical resonance for a specific resonation frequency. The above-mentioned phenomena together provide the resultant oscillations characteristic of the mechanical-electrical system. This characteristic may be observed by means of the spectrum analyzer 125. FIG. 3 shows an example frequency response observed by the spectrum analyzer 125, wherein the continuous line f1 represents an initial frequency response and the dashed line f2 represents a frequency response observed after some time, when some species were collected by the adsorbent 111 and the total mass of the cage 110 has increased, causing reduction of the resonant frequency.

In other words, the mass $m = m_{cage} + m_{adsorbent}$ is excited to oscillate by the exciter 120 that provides electromagnetic coupling of two circuits: one circuit comprising outer coil 121 of the exciter 120 on a transmitter side and second circuit comprising a 'virtual-like coil' on a receiver side; the 'virtual-like coil' is formed by a closed (electrically short-circuited) structure of the ferrite material of the cage 110; the ferrite material inherently being ferromagnetic material. The eddy currents induced within the cage 110 act against the changes exerted by the induced magnetic field. As a consequence, a resultant force enables the cage 110 to oscillate— 'trying to push' the cage 110 out of the induced magnetic field.

As the species (for example, sulfur particles) are adsorbed, the resonant frequency decreases from frequency $f_1$ to frequency f2, which can be represented by a set of equations:

$$\begin{cases} f_1 = \frac{1}{2\pi}\sqrt{\frac{k}{(m_{cage} + m_{sulfur} = "0")}} \\ f_2 = \frac{1}{2\pi}\sqrt{\frac{k}{(m_{cage} + m_{sulfur})}} \end{cases}$$

wherein $m_{sulfur}$ represents the mass of absorbed sulfur, which is initially 0.

Correspondingly, knowing the resonant frequency f2 after some time of operation of the system, the mass of the adsorbed species can be calculated as:

$$m_{sulfur} = \frac{k(f_1^2 - f_2^2)}{4\pi^2 f_1^2 f_2^2}$$

Therefore, the system is not only capable of monitoring the change of adsorbed species, but also to determine the amount of species adsorbed by the adsorbent 111. Since the adsorbent 111 within the cage 110 is the same as the adsorbent of the main adsorbent deposit 24, one can also determine the total amount of species adsorbed by the main adsorbent deposit 24 based on the weight ratio between the initial weight of the main adsorbent deposit 24 and the adsorbent 111 within the cage 110. Correspondingly, the system can be used for example to inform the user about the necessity to change the main adsorbent deposit 24 within the chamber when a predetermined amount of species have been adsorbed therein.

Figure 4:
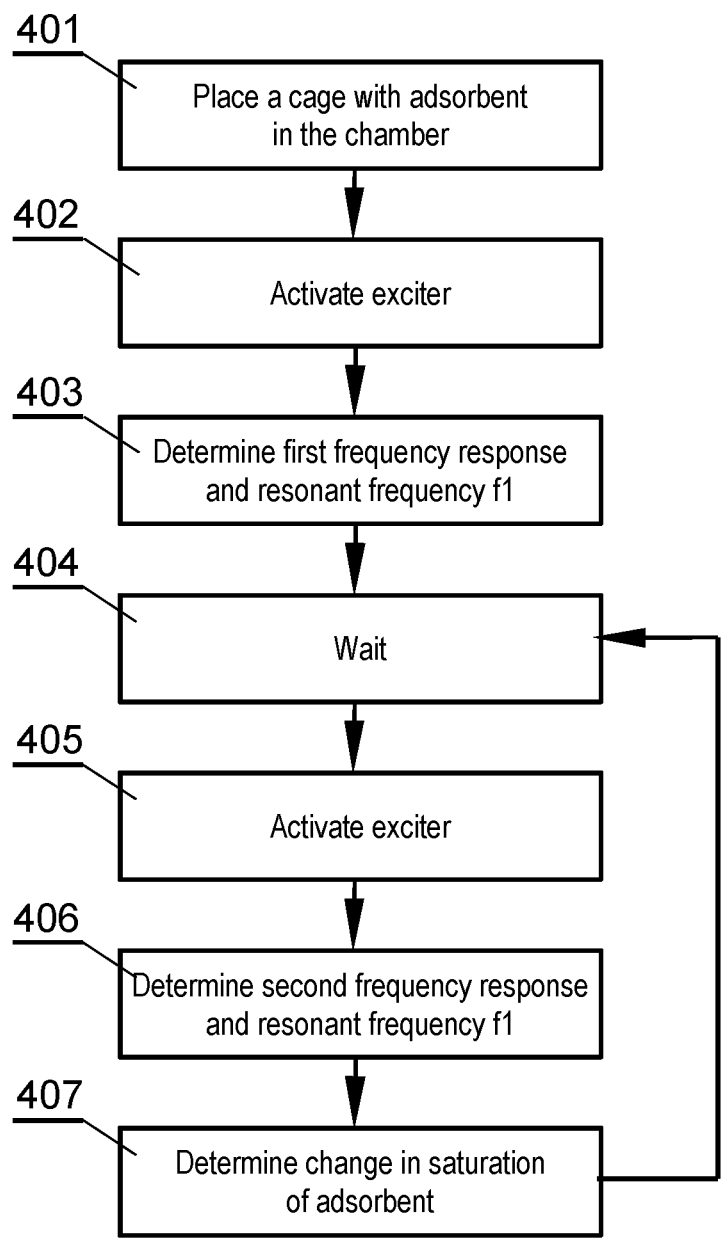
FIG. 4 shows a method for determining a change of saturation of adsorbent according to the present invention.

FIG. 4 summarizes the steps of the method to determine a change of saturation of adsorbent. First, a cage 110 with adsorbent 111 is placed within the chamber 20 on a cage holder in step 401. Next, the exciter 120 is activated in step 402 to induce oscillations of the cage 110 and a frequency response is determined in step 403 to obtain a first resonant frequency $f_1$. Next, some time is allowed to elapse in step 404—the time corresponding to interval between successive measurements. Then, the exciter 120 is activated again in step 405 to induce oscillations of the cage 110 and a frequency response is determined in step 406 to obtain a second resonant frequency $f_2$. Then the saturation change is determined by the saturation detector in step 407 based on the change of frequency response, in particular the difference between the frequencies $f_2$ and $f_1$. For example, the detector may output a simple information that the saturation has changed if the difference between the frequencies $f_2$ and $f_1$ is above a predetermined threshold (preferably, higher than the accuracy threshold of the system)—this may allow to detect e.g. a moment when the stream flowing through the chamber 20 contains some species that have been adsorbed. Alternatively, the detector may be configured to detect a substantial change between the frequencies $f_2$ and $f_1$, which may be set to a value corresponding to such that indicates that the adsorbent has adsorbed maximum allowable amount of species and that the main adsorbent deposit 24 (along with the adsorbent 111 in the cage 110) shall be replaced. Yet alternatively, the detector 126 may be configured to calculate the exact amount of adsorbed species $m_{sulfur}$ by using the equations presented above. The procedure can be continued iteratively.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A system for determining a change of saturation of an adsorbent (111) susceptible to adsorption of species in an adsorption chamber (20), the system comprising:
   a cage (110) made of a ferrite material and holding the adsorbent (111) therein;
   a cage holder (112) configured to hold the cage (110) within the adsorption chamber (20) such that the movement of the cage (110) at least in a first axis is restricted to a smaller extent than in a second axis;
   an exciter (120) comprising a coil (121) arranged at the cage, wherein the coil is connected to a voltage generator (122) and the exciter (120) is configured to induce eddy currents within the cage (110) resulting in oscillation of the cage (110) in the first axis;
   a spectrum analyzer (125) connected to the coil (121) and configured to analyze the voltage within the coil (121) and determine its frequency response; and
   a saturation detector (126) configured to determine the change of saturation based on the change of the frequency response determined by the spectrum analyzer (125).

2. The system according to claim 1, wherein the cage holder (112) comprises an elastic arm on which the cage (110) is arranged within the chamber (20).

3. The system according to claim 1, wherein the cage (110) contains adsorbent (111) in amount smaller than a main adsorbent deposit (24) within the chamber (20).

4. The system according to claim 1, wherein the chamber (20) has an inlet (21) and an outlet (22) for a stream with species to flow via the chamber (20) and wherein the cage (110) arranged so that upon transport of the stream though the chamber (20), the adsorbent (111) within the cage (110) is exposed to the same stream as a main deposit of adsorbent (24) within the chamber (20).

5. The system according to claim 1 wherein the cage (110) is arranged coaxially with the chamber (20) and covers from 75 to 80% of the lumen of the chamber (20).

6. The system according to claim 1 wherein the cage holder (112) comprises an elastic bar with the cage (110) mounted at the end thereof.

7. The system according to claim 1 wherein the coil (121) is wound around the cage (110).

8. A method for determining a change of saturation of absorbent using the device of claim 1, the method comprising:
   activating (402) the exciter to induce oscillations of the cage (110);
   determining (403) a first frequency response by the spectrum analyzer (125);
   awaiting (404) for a measurement interval;
   activating (405) the exciter to induce oscillations of the cage (110);
   determining (406) a second frequency response by the spectrum analyzer (125); and
   determining (407) a saturation change by the saturation detector (126) based on the first frequency response and the second frequency response.

* * * * *